US012625376B2

(12) United States Patent
Toy et al.

(10) Patent No.: US 12,625,376 B2
(45) Date of Patent: May 12, 2026

(54) TECHNIQUES FOR SECURING AND ALIGNING A PROJECTOR ASSEMBLY AND A WAVEGUIDE ASSEMBLY BY COUPLING SUPPORT LEGS OF THE WAVEGUIDE ASSEMBLY TO CORRESPONDING RECEPTACLES OF THE WAVEGUIDE ASSEMBLY

(71) Applicant: Meta Platforms Technologies, LLC, Menlo Park, CA (US)

(72) Inventors: Randall Scott Toy, Sammamish, WA (US); James Schultz, Redmond, WA (US); Zhiqiang Liu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 356 days.

(21) Appl. No.: 18/174,814

(22) Filed: Feb. 27, 2023

(65) Prior Publication Data
US 2024/0012255 A1 Jan. 11, 2024

Related U.S. Application Data

(60) Provisional application No. 63/388,074, filed on Jul. 11, 2022.

(51) Int. Cl.
*G02B 27/00* (2006.01)
*F21V 8/00* (2006.01)
*G02B 27/01* (2006.01)

(52) U.S. Cl.
CPC ....... *G02B 27/0176* (2013.01); *G02B 6/0088* (2013.01); *G02B 27/0172* (2013.01); *G02B 2027/0178* (2013.01)

(58) Field of Classification Search
CPC .............. G02B 27/0176; G02B 6/0088; G02B 27/0172; G02B 2027/0178; G02B 27/01;
(Continued)

(56) References Cited

U.S. PATENT DOCUMENTS 581,359 A * 4/1897 Meigs ...................... G02C 1/02
351/140
2015/0277125 A1* 10/2015 Hirano ............... G02B 27/0176
359/633
(Continued)

FOREIGN PATENT DOCUMENTS

WO 2015114680 A1 8/2015
WO 2021138607 A1 7/2021

OTHER PUBLICATIONS

International Preliminary Report on Patentability for International Application No. PCT/US2023/027165, mailed Jan. 23, 2025, 8 pages.
(Continued)

*Primary Examiner* — Henry Duong
(74) *Attorney, Agent, or Firm* — McDermott Will & Schulte LLP

(57) ABSTRACT

Optical assemblies may include a projector assembly and a waveguide assembly. The projector assembly may include at least one light subprojector and a housing including at least one receptacle. The waveguide assembly may include a waveguide and a waveguide holder. The housing may include at least one receptacle and the waveguide holder may include at least one support leg. The support leg may be positioned within, and secured to, the receptacle to align the projector assembly with the waveguide assembly. Related head-mounted displays, systems, and methods are also disclosed.

17 Claims, 11 Drawing Sheets

(58) Field of Classification Search
CPC ............ G02B 27/0101; G02B 27/0103; G02B
27/0149; G02B 27/017; G02B 27/0179;
G02B 27/0189; G02B 2027/0105; G02B
2027/0107; G02B 2027/0109; G02B
2027/011; G02B 2027/0112; G02B
2027/0114; G02B 2027/0116; G02B
2027/0118; G02B 2027/012; G02B
2027/0121; G02B 2027/0123; G02B
2027/0125; G02B 2027/0127; G02B
2027/0129; G02B 2027/013; G02B
2027/0132; G02B 2027/0134; G02B
2027/0136; G02B 2027/0138; G02B
2027/014; G02B 2027/0141; G02B
2027/0143; G02B 2027/0145; G02B
2027/0147; G02B 2027/015; G02B
2027/0152; G02B 2027/0154; G02B
2027/0156; G02B 2027/0158; G02B
2027/0159; G02B 2027/0161; G02B
2027/0163; G02B 2027/0165; G02B
2027/0167; G02B 2027/0169; G02B
2027/0174; G02B 2027/0181; G02B
2027/0183; G02B 2027/0185; G02B
2027/0187; G02B 2027/019; G02B
2027/0192; G02B 2027/0194; G02B
2027/0196; G02B 2027/0198
USPC .......................................................... 359/630
See application file for complete search history.

(56) References Cited

U.S. PATENT DOCUMENTS

| | | | | |
|---|---|---|---|---|
| 2017/0160548 | A1* | 6/2017 | Woltman | ........... G02B 27/0172 |
| 2020/0096775 | A1 | 3/2020 | Franklin et al. | |
| 2020/0371357 | A1* | 11/2020 | Choi | .................. G02B 27/0172 |
| 2020/0400948 | A1 | 12/2020 | Maric et al. | |
| 2021/0055565 | A1* | 2/2021 | Moore | ................... G02C 11/10 |
| 2021/0103146 | A1 | 4/2021 | Travers et al. | |
| 2021/0364802 | A1 | 11/2021 | Uchiyama et al. | |
| 2023/0027493 | A1* | 1/2023 | Shams | ................ G02B 6/0088 |

OTHER PUBLICATIONS

International Search Report and Written Opinion for International Application No. PCT/US2023/027165, mailed Nov. 2, 2023, 11 pages.

* cited by examiner

500

500

600A
602
610
604
606
601
608
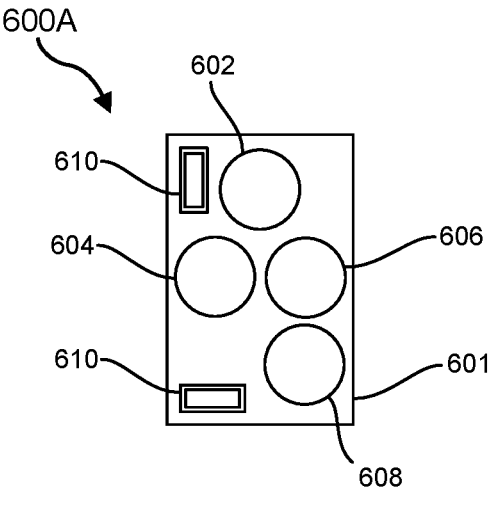
FIG. 6A
600B
612
610
610
614
601
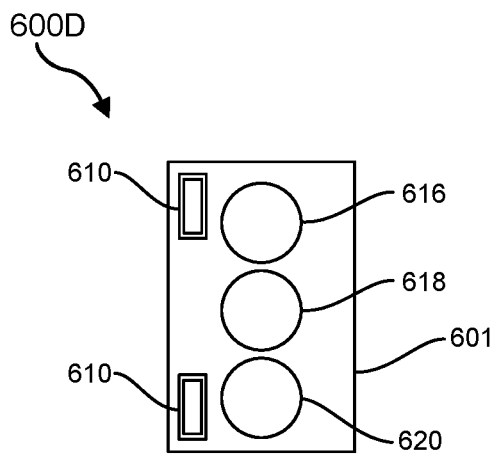
FIG. 6B
600C
601
610
613
610
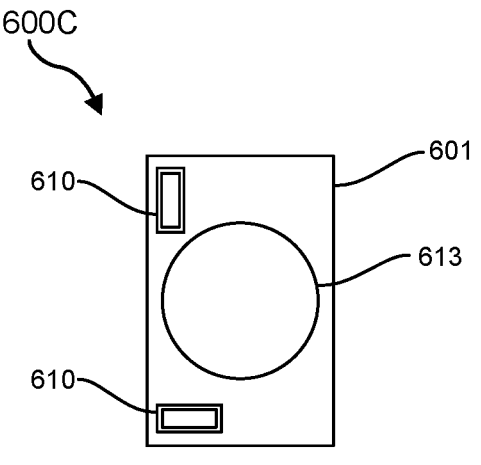
FIG. 6C
600D
610
616
618
601
610
620
FIG. 6D
600E
611
622
601
611
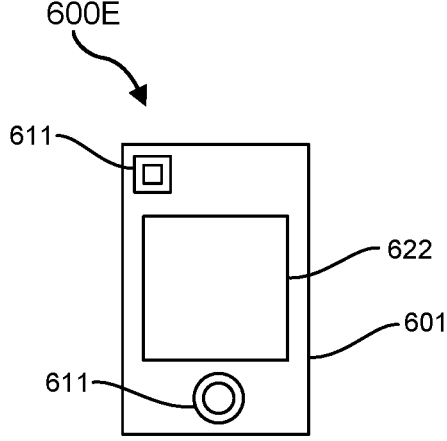
FIG. 6E

900

Determine a location and orientation of a waveguide assembly relative to a projector assembly to align the projector assembly with the waveguide assembly
910

Position at least one support leg of the waveguide assembly within at least one respective receptacle of the projector assembly
920

Couple the at least one support leg to the at least one receptacle
930

TECHNIQUES FOR SECURING AND ALIGNING A PROJECTOR ASSEMBLY AND A WAVEGUIDE ASSEMBLY BY COUPLING SUPPORT LEGS OF THE WAVEGUIDE ASSEMBLY TO CORRESPONDING RECEPTACLES OF THE WAVEGUIDE ASSEMBLY

CROSS REFERENCE TO RELATED APPLICATION

This application claims the benefit of U.S. Provisional Patent Application Ser. No. 63/388,074, titled "OPTICAL ASSEMBLIES, HEAD-MOUNTED DISPLAYS, AND RELATED METHODS," filed on 11 Jul. 2022, the entire disclosure of which is incorporated herein by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIGS. 6A-6E are top plan view of light projector assemblies, according to various embodiments of the present disclosure.

Figure 1:
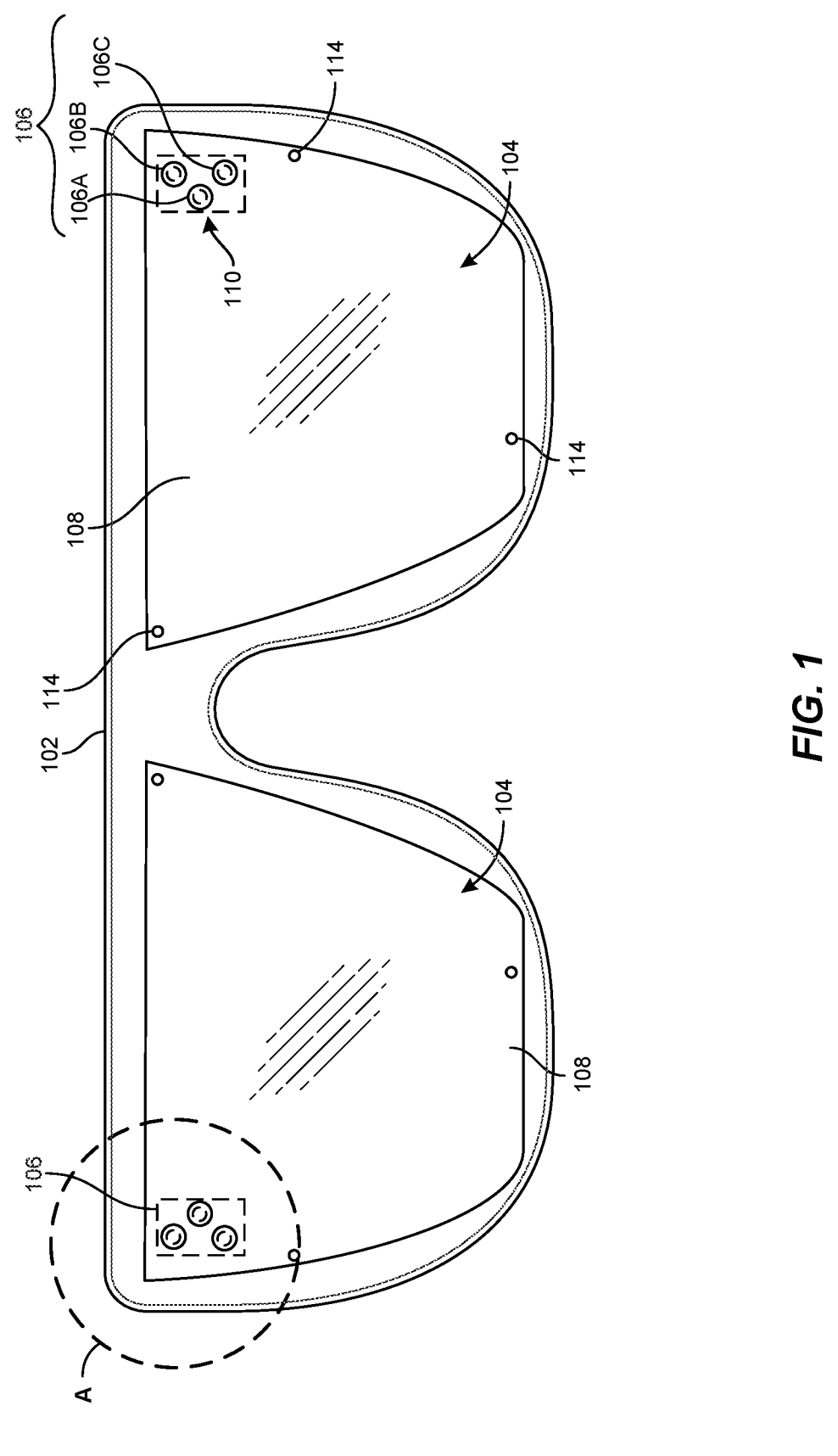
FIG. 1 is a plan view of a head-mounted display, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Head-mounted displays (HMDs) including one or more near-eye displays are often used to present visual content to a user for use in artificial-reality applications. One type of near-eye display includes a waveguide that directs light from a projector to a location in front of the user's eyes. Because of the visual sensitivity of human eyes, slight deviations in optical quality can be very apparent to the user. Proper alignment of projectors and waveguides with each other, with a supporting frame, relative to the user, and/or relative to the overall sensory system can be important to inhibit such deviations and to improve the user's experience viewing visual content presented by near-eye displays.

The present disclosure is generally directed to systems and methods for aligning optical components (e.g., of near-eye displays), such as for aligning a waveguide with corresponding projectors, one or more projectors with a frame, a waveguide with a frame, and/or a projector and waveguide assembly with a frame. For example, embodiments of the present disclosure may include optical assemblies including a projector assembly and a waveguide assembly. The projector assembly may include a housing with at least one receptacle and at least one light subprojector supported by the housing. The waveguide assembly may include a waveguide and a waveguide holder abutting an edge region of the waveguide. The waveguide holder may include at least one support leg extending therefrom. The support leg may be positioned at least partially within and coupled to the at least one receptacle to secure the projector assembly to the waveguide assembly. The receptacle may have a size and shape that allows the support leg to be shifted therein, such as to achieve a desired relative position and orientation of the projector assembly with the waveguide assembly to optically align the light subprojectors with an input grating of the waveguide.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
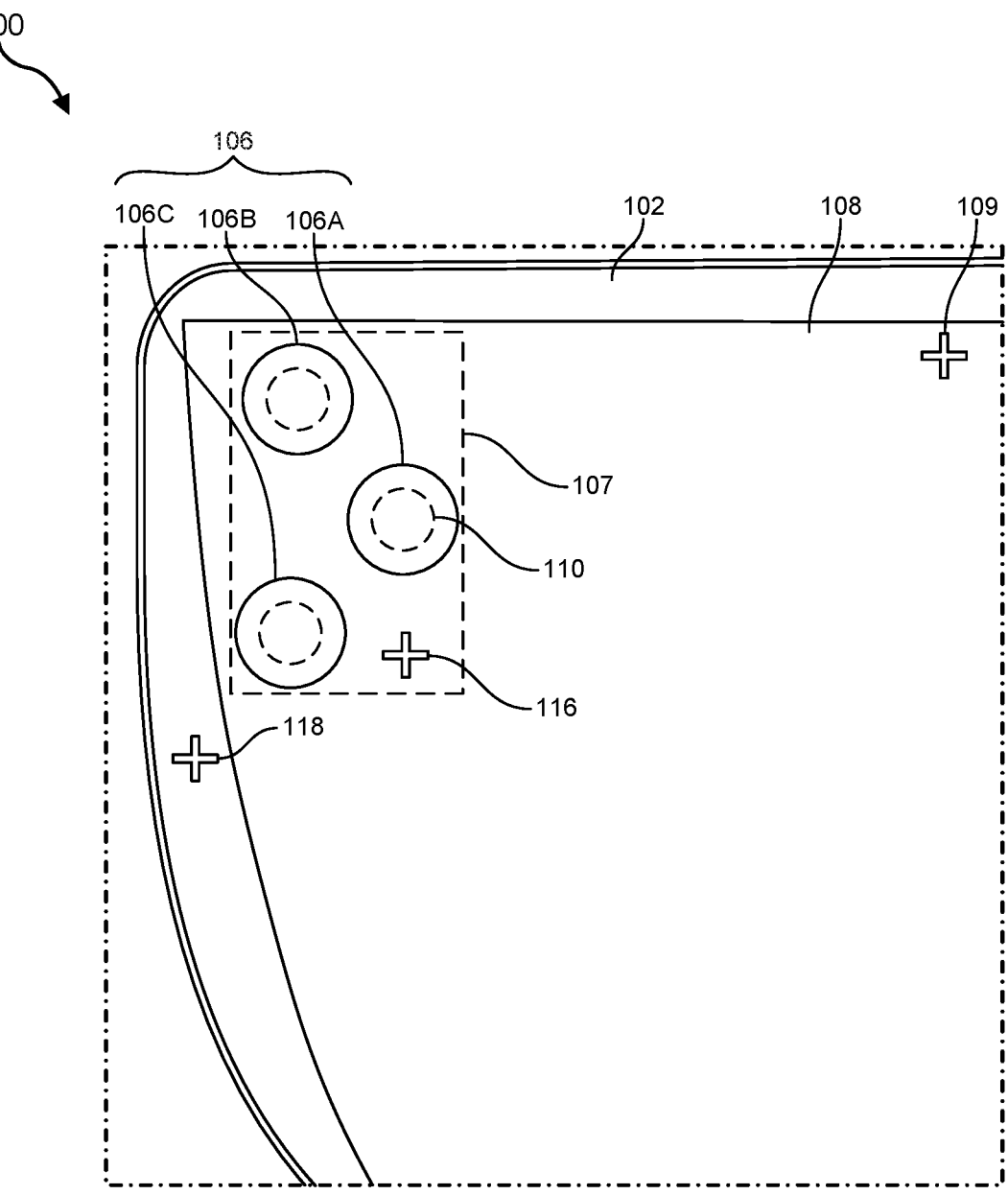
FIG. 2 is a detailed view of a light projector mounted to a frame of the head-mounted display, taken at dashed circle A of FIG. 1, according to at least one embodiment of the present disclosure.

With reference to FIGS. 1 and 2, the following will describe example head-mounted displays and components thereof, according to embodiments of the present disclosure.

Figure 8:
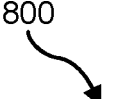
FIG. 8 is a cross-sectional side view of an optical assembly, according to at least one embodiment of the present disclosure.
Figure 8:
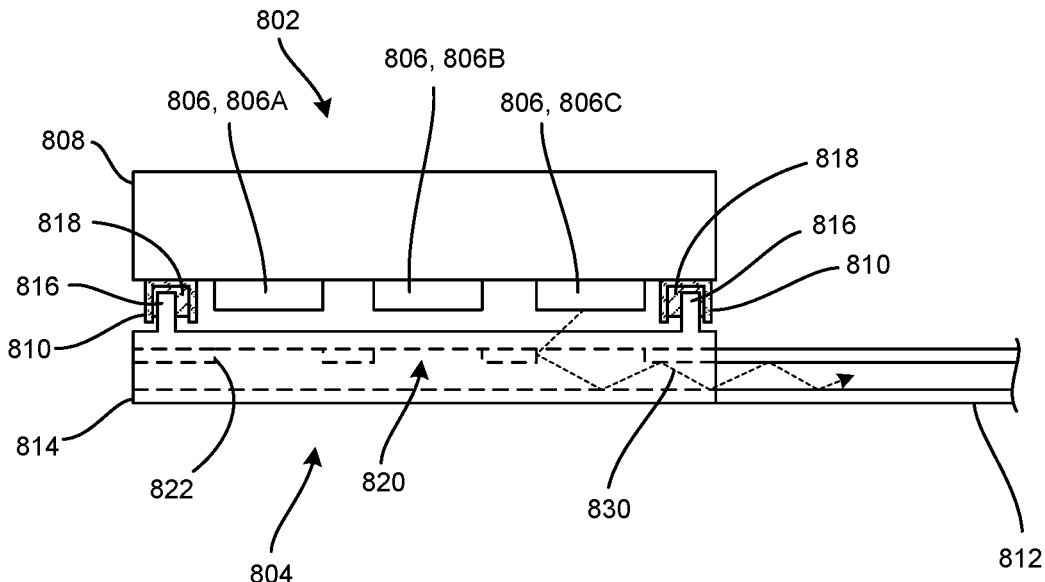
Figure 9:
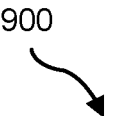
FIG. 9 is a flow chart illustrating a method of fabricating an optical assembly, according to at least one embodiment of the present disclosure.
Figure 9:
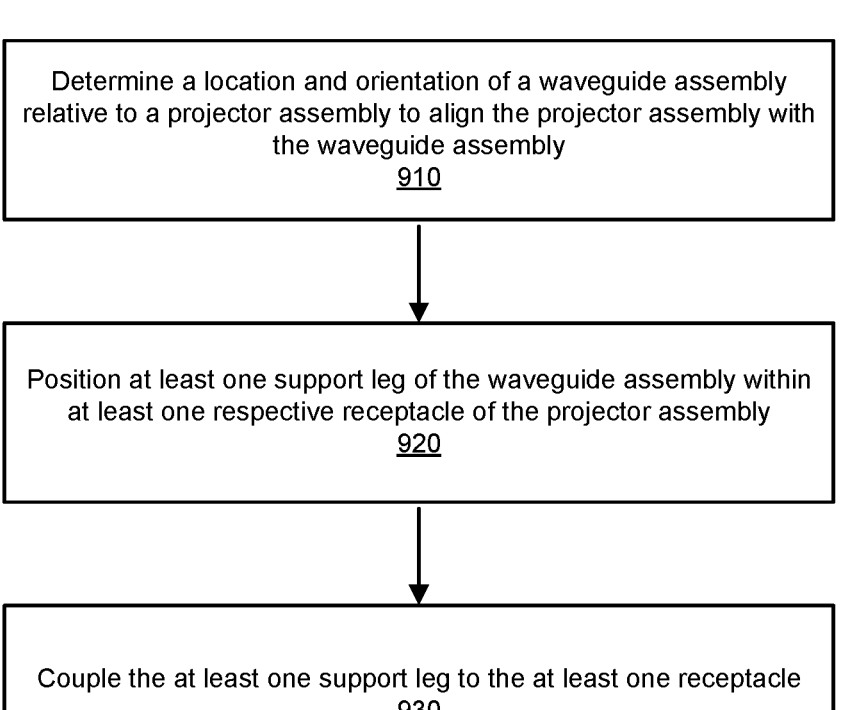

The optical alignment of a projected pattern as viewed by a camera will then be described with reference to FIG. 3. Next, an embodiment of a head-mounted display and cameras for alignment will be described with reference to FIG. 4. With reference to FIGS. 5A-6E, the following will provide detailed descriptions of various example light projector assemblies. An example embodiment of a waveguide assembly will then be described with reference to FIG. 7. With reference to FIG. 8, an example optical assembly will then be described. With reference to FIG. 9, the following will describe an example method of fabricating optical assemblies. Finally, example augmented-reality glasses and virtual-reality headsets that may be used in connection with embodiments of this disclosure will be descried with reference to FIGS. 10 and 11.

FIG. 1 is a plan view of a head-mounted display 100, according to at least one embodiment of the present disclosure. The head-mounted display 100 may include a frame 102 and a display assembly 104 coupled to the frame 102. The display assembly 104 for each eye may include a light projector 106 (shown in dashed lines in FIG. 1) and a waveguide 108 configured to direct images from the light projector 106 to a user's eye. In some examples, the light projector 106 may include a plurality of (e.g., three) subprojectors 106A, 106B, 106C that are configured to project light of different wavelengths (e.g., colors, such as red, green, blue, infrared, etc.). The waveguide 108 may include at least one input grating 110 positioned adjacent to and optically aligned with the light projector 106. The input grating 110 may be configured to enable light from the subprojectors 106A, 106B, 106C to enter into the waveguide 108 to be directed to the center of the waveguide 108 for presentation to the user's eye. For example, as shown in FIG. 1 in dashed lines, the input grating 110 may include three optical apertures respectively aligned with the three subprojectors 106A, 106B, 106C of the light projector 106.

In some examples, the head-mounted display 100 may be implemented in the form of augmented-reality glasses. Accordingly, the waveguide 108 may be at least partially transparent to visible light to allow the user to view a real-world environment through the waveguide 108. Images presented to the user's eye by the light projectors 106 may overlay the user's view of the real-world environment.

The waveguide 108 may be physically secured to the frame 102 in a manner that aligns the waveguide 108 to the light projectors 106, to a user's view, and/or to the frame 102. For example, the light projectors 106 may first be aligned with and secured to the frame 102. Then, the input gratings 110 of the waveguides 108 may be optically aligned with the light projectors 106.

In some embodiments, the waveguide 108 may be secured to the frame 102 with an adhesive material, one or more fasteners, an adhesive, a clip, etc., such as after completion of the optical alignment of the waveguides 108 with the respective light projectors 106. For example, an adhesive material may be positioned between the waveguide 108 and the frame 102 at multiple (e.g., two, three, or more than three) distinct locations 114 to maintain the relative position between the waveguide 108 and the light projector 106. In additional embodiments, the waveguide 108 may be secured to the frame 102 in a continuous manner, such as along one or more peripheral edges of the waveguide 108 by an adhesive, a clip, a frame cover element, etc.

FIG. 2 is a detailed view of the light projector 106 mounted to the frame 102 of the head-mounted display 100, taken at dashed circle A of FIG. 1, according to at least one embodiment of the present disclosure. As shown in FIG. 2, the light projector 106 may be mounted on the frame 102 of the head-mounted display 100, such as in an upper corner of the frame 102. The first subprojector 106A may include a blue light source, the second subprojector 106B may include a red light source, and the third subprojector 106C may include a green light source. Other colors and arrangements of the subprojectors 106A, 106B, 106C may also be possible.

To assemble the head-mounted display 100, the three subprojectors 106A, 106B, 106C may be initially assembled with each other (e.g., three subprojectors mounted to a common substrate 107, three collimating lenses aligned on the three subprojectors, etc.) to form the light projector 106 as a unit. The light projector 106 (e.g., the substrate 107 of the light projector 106) may include one or more projector fiducial marks 116, which may be used in optically aligning (e.g., positioning, orienting, securing) the light projector 106 with the frame 102. In some examples, the frame 102 may likewise include one or more frame fiducial marks 118 to assist in the optical alignment of the light projector 106 with the frame 102.

Optical alignment of the light projector 106 relative to the frame 102 may involve viewing the light projector 106 and/or frame 102 during placement of the light projector 106 in or on the frame 102 with one or more cameras, which may be used to identify the location and orientation of the projector fiducial mark(s) 116 relative to the location and orientation of the frame fiducial mark(s) 118. The projector fiducial mark(s) 116 and the frame fiducial mark(s) 118 are each shown in FIG. 2 in the shape of a plus sign. In additional examples, other shapes, physical features (e.g., of the light projector 106 and/or of the frame 102), reflective surfaces, or other optical identifiers may be used to optically align the light projector 106 relative to the frame 102. In some embodiments, the light projector 106 may be aligned relative to the frame 102 using an image projected by the light projector 106, such as is explained below with reference to FIG. 3.

After the light projector 106 is aligned with and secured to the frame 102, the waveguide 108 may be aligned with the light projector 106 and secured to the frame 102. For example, the waveguide 108 may include a waveguide fiducial mark 109, which may be used in optically aligning (e.g., positioning, orienting, securing) the waveguide 108 to the frame 102 and/or to the light projector 106. In addition, the input gratings 110 of the waveguide 108 may be optically aligned with the subprojectors 106A, 106B, 106C. In some examples, the input gratings 110 may be smaller than respective apertures of the subprojectors 106A, 106B, 106C as shown in FIG. 2. In additional examples, the input gratings 110 may be substantially the same size as or larger than the respective apertures of the subprojectors 106A, 106B, 106C.

Figure 3:
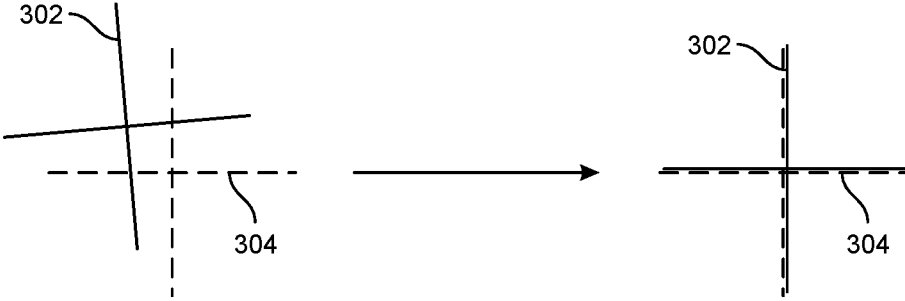
FIG. 3 illustrates optical alignment of a projected pattern as viewed by a camera, according to at least one embodiment of the present disclosure.

FIG. 3 illustrates optical alignment of a projected pattern 302 as viewed by a camera, according to at least one embodiment of the present disclosure. The projected pattern 302 may be aligned with a camera target 304. The projected pattern 302 may be produced by a light projector, such as the light projector 106 described above. One or more cameras may view the projected pattern 302 and compare the location and orientation of the projected pattern 302 to the camera target 304. The light projector and/or a frame to which the light projector is to be mounted may be moved (e.g., laterally shifted, angled, rotated, etc.) to align the projected pattern 302 with the camera target 304 to an acceptable resolve (e.g., within an acceptable tolerance) before the light projector is fixed in position relative to the frame. In some examples, the alignment of the projected pattern 302 with the camera target 304 may be performed while exposing the light projector 106 and the frame 102 to conditions that may be expected during use of the resulting assembly. For example, a heat load may be applied to the light projector 106 during alignment to mimic thermal loading that may occur during use.

Figure 4:
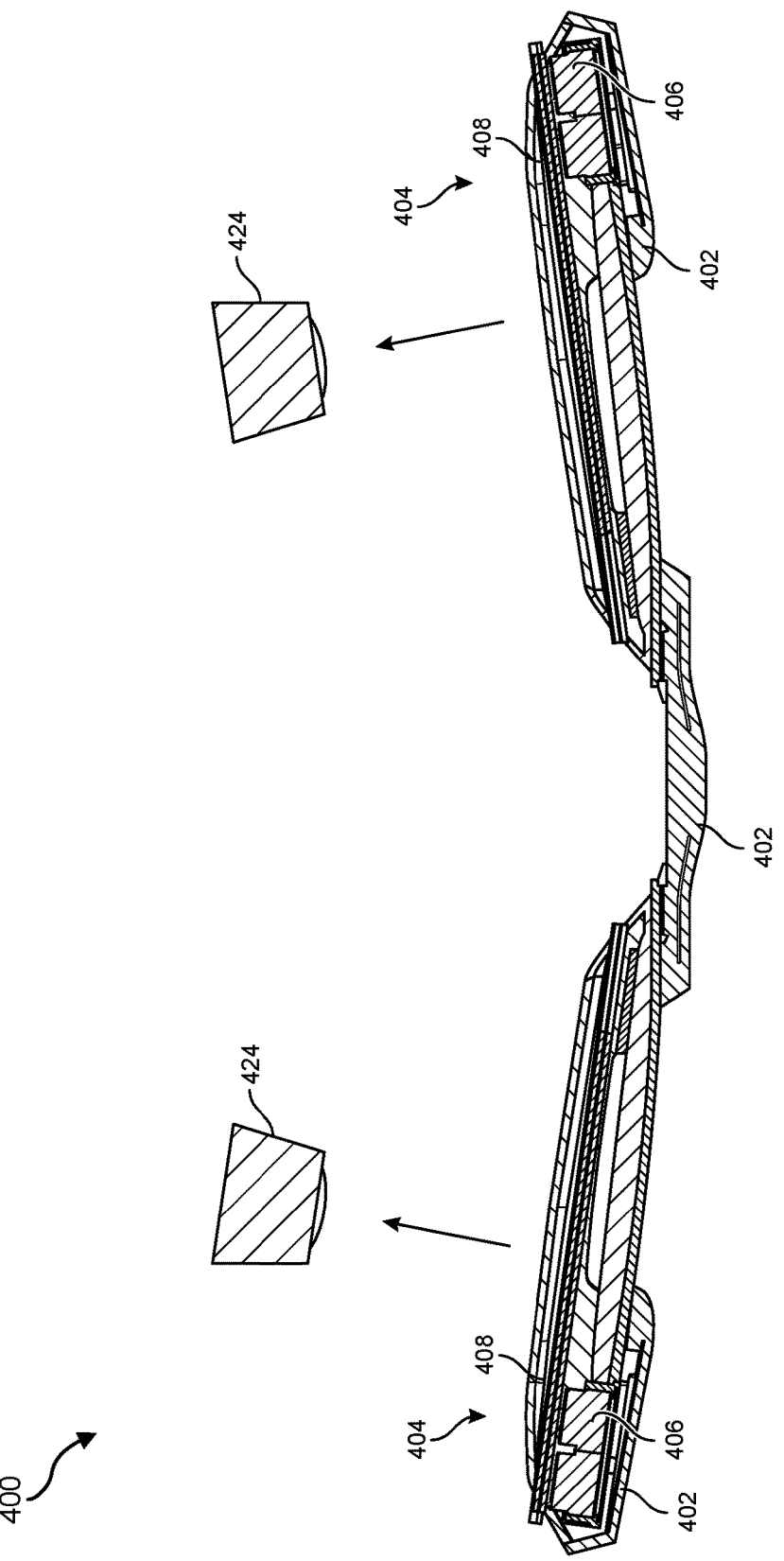
FIG. 4 is a cross-sectional view of a head-mounted display with alignment cameras, according to at least one embodiment of the present disclosure.

FIG. 4 is a cross-sectional view of a head-mounted display 400 with alignment cameras 424, according to at least one embodiment of the present disclosure. In at least some respects, the head-mounted display 400 may be similar to the head-mounted display 100 described above. For example, the head-mounted display 400 may include a frame 402, and a display assembly 404 including a light projector 406 and a waveguide 408 mounted to the frame 402.

The alignment cameras 424 may be used during assembly of the head-mounted display 400 to optically align the light projector 406 with the frame 402 and/or to optically align the waveguide 408 (e.g., input gratings of the waveguide 408) with the light projector 406. For example, the alignment cameras 424 may be used to detect the location and/or orientation of a fiducial mark (e.g., the projector fiducial marks 116, the frame fiducial marks 118, the waveguide fiducial marks 109, etc.), a physical component or feature, a reflective material, etc. In additional examples, the alignment cameras 424 may be used to detect a location and/or orientation of a projected pattern (e.g., the projected pattern 302) relative to a target (e.g., the camera target 304). This detected information may be used to adjust a position and/or orientation of the light projector 406 relative to the frame 402 and/or of the waveguide 408 relative to the light projector 406 and/or frame 402.

Figure 5A:
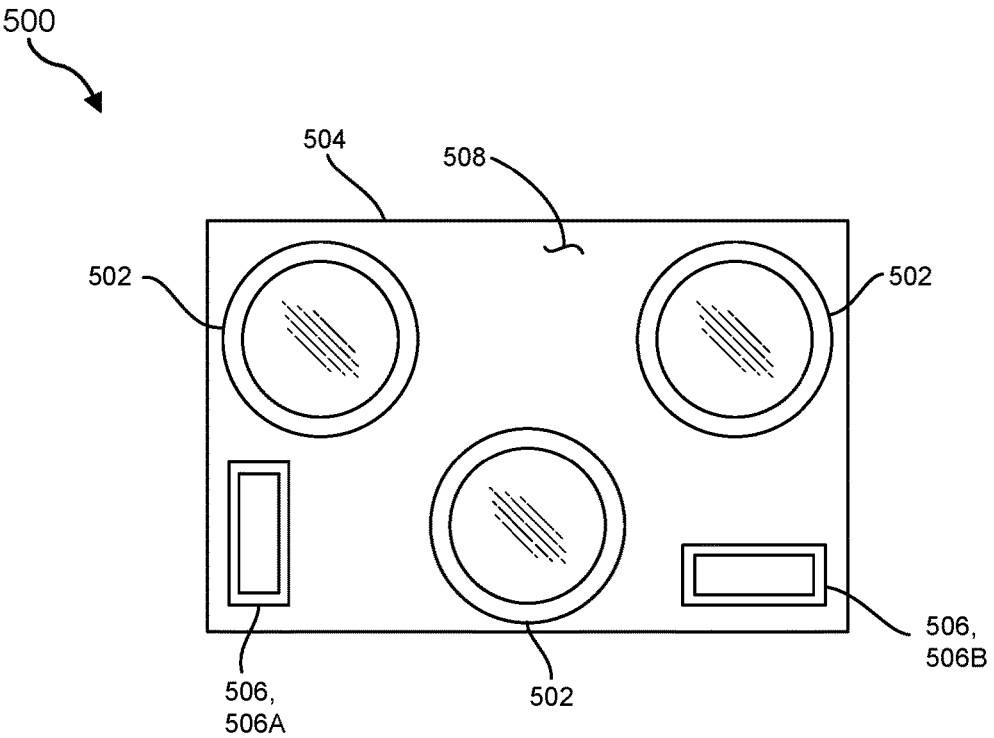
FIGS. 5A and 5B are, respectively, a top plan view and a perspective view of a light projector assembly, according to at least one embodiment of the present disclosure.
Figure 5B:
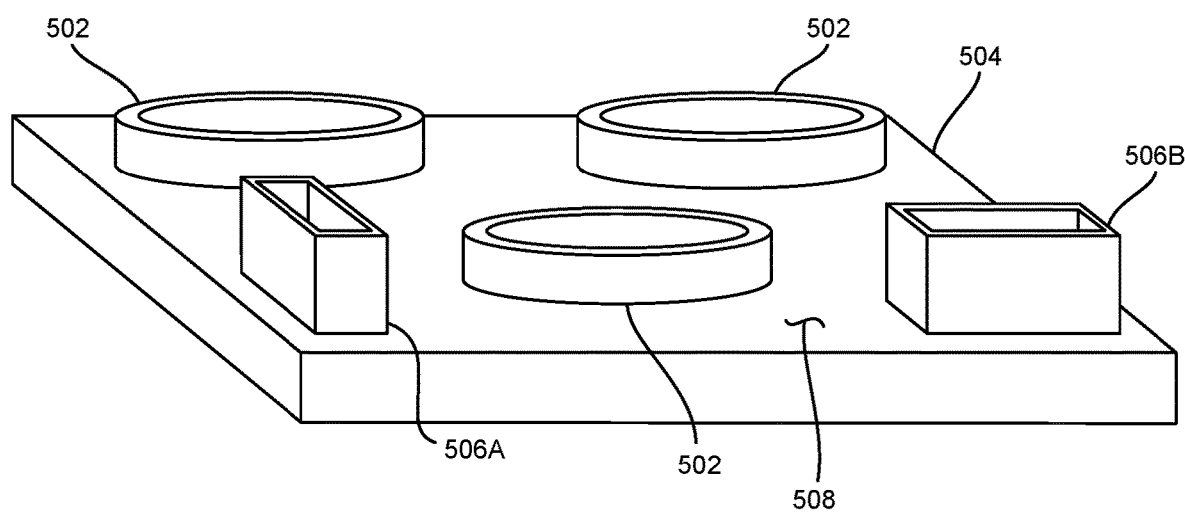

FIGS. 5A and 5B are, respectively, a top plan view and a perspective view of a light projector assembly 500, according to at least one embodiment of the present disclosure. The light projector assembly 500 may include at least one light subprojector 502 supported by a housing 504. The housing 504 may include a first receptacle 506A and a second receptacle 506B (collectively referred to as "receptacles 506"), which may be coupled to and extend from a face 508 of the housing 504 on a side of the housing 504 where the light subprojectors 502 are located. In some examples, as illustrated in FIGS. 5A and 5B, two receptacles 506 may extend from the face 508 of the housing 504. In additional examples, one or more of the receptacles 506 may be at least partially disposed within the face 508 of the housing 504 (e.g., in the form of an aperture in the face 508 of the housing 504).

Light projection may be provided by one, two, three (as illustrated in FIGS. 5A and 5B), or more light subprojectors 502. For example, the light subprojectors 502 may be configured to respectively emit light of different wavelengths (e.g., red, green, blue, infrared, etc.). In additional examples, a single light subprojector 502 may be a multi-color light projector 502 configured to emit light of different wavelengths. Each of the light subprojectors 502 may include an array of light-emitting pixels.

The receptacles 506 may be configured for assisting in, and maintaining, alignment of the light subprojectors 502 with one or more input gratings of a corresponding waveguide. For instance, the receptacles 506 may be used in a manner similar to a groove of a tongue-in-groove coupling between a waveguide assembly and the projector assembly 500. One or more corresponding support legs of the waveguide assembly may be positioned within the receptacles 506 and secured to the receptacles 506, such as with an adhesive (e.g., a liquid-dispensed adhesive (LDA)), solder, and/or a weld disposed within the receptacles 506. The waveguide assembly and/or projector assembly 500 may be positioned and oriented relative to each other to maintain the light subprojectors 502 in a predetermined position (e.g., orientation, distance, etc.) relative to corresponding input gratings of the waveguide assembly prior to being secured to each other.

As illustrated in FIGS. 5A and 5B, the first receptacle 506A may be rectangular and may have a first length extending in a first direction (e.g., up and down from the perspective of FIG. 5A). The second receptacle 506B may be rectangular and may have a second length extending in a second direction (e.g., left and right from the perspective of FIG. 5A). In some examples, the first direction and the second direction may be substantially perpendicular to each other. In some examples, this arrangement of the receptacles 506 may facilitate relative rotation between the projector assembly 500 and a corresponding waveguide to align the light subprojectors 502 with input gratings of the waveguide.

The angle and distance of the light subprojectors 502 relative to the corresponding input gratings of the waveguide may affect optical quality of a resulting optical assembly. Providing the receptacles 506 with a sufficient internal size and amount of coupling material (e.g., adhesive, solder, and/or weld material) may enable the projector assembly 500 to be adjusted in position and orientation to achieve a desired angle and distance of the light subprojectors 502 relative to the input gratings. The receptacles 506 may have an internal area larger than the corresponding support legs of the waveguide assembly to allow for some movement of the waveguide assembly relative to the projector assembly 500 for aligning the light subprojectors 502 with the input gratings of the waveguide assembly to within a predetermined threshold (e.g., within 5 arcminutes or less of rotation, within 2 arcminutes or less of rotation, within 1 mm or less of translation, within 500 μm or less of translation, etc.). In some examples, an internal width and length of the receptacles 506 may each be at least 1 mm larger than a corresponding support leg of a waveguide assembly, such as 1 mm larger, 2 mm larger, 3 mm larger, 4 mm larger, or 5 mm larger.

Due to manufacturing tolerances and uncertainties, each individual light projector assembly 500 may be formed with the light subprojectors 502 positioned slightly differently on the housing 504. Similarly, each individual waveguide assembly may also be formed with the input gratings thereof in slightly different locations relative to the waveguides and/or another component of the waveguide assembly. Thus, each individual light projector assembly 500 and/or corresponding waveguide assembly may be tested to determine a proper alignment of the light subprojectors 502 with the input gratings. After a proper alignment (e.g., an alignment within a predetermined tolerance) is determined, support legs of the waveguide assembly may be positioned within the receptacles 506 at the proper relative position to achieve the proper alignment. The support legs may then be secured in place within the receptacles 506.

FIGS. 6A-6E are top plan views of light projector assemblies 600A-600E, according to various embodiments of the present disclosure.

As shown in FIG. 6A, a light projector assembly 600A may include four subprojectors 602, 604, 606, 608 arranged on a substrate 601. The four subprojectors 602, 604, 606, 608 may be positioned on the substrate 601 in any suitable spatial configuration. The four subprojectors 602, 604, 606, 608 may be configured to respectively emit light of four different wavelengths, such as red, green, blue, and infrared. Each of the subprojectors 602, 604, 606, 608 may include an array of pixels that may be selectively activated to be combined to create an image for display to a user. In some examples, one of the subprojectors 602, 604, 606, 608 may be configured to emit infrared light, such as a structured infrared light pattern, an infrared glint, or a flood of infrared light, such as to facilitate eye tracking.

The light projector assembly 600A may also include two receptacles 610, which may be similar to the receptacles 506 described above with reference to FIGS. 5A and 5B. The receptacles may be shaped and sized to help align (e.g., in distance, angle, and/or position) the subprojectors 602, 604, 606, 608 of the light projector assembly 600A to respective input gratings of a waveguide assembly to within a predetermined alignment threshold.

As shown in FIG. 6B, a light projector assembly 600B may include two subprojectors 612, 614 on the substrate 601. FIG. 6B illustrates that the subprojectors 612, 614 may be different sizes. For example, the subprojector 612 may be configured to emit light of one wavelength or range of wavelengths and the larger subprojector 614 may be configured to emit light of another, different wavelength or range of wavelengths. In one example, the smaller subprojector 612 may be configured to emit infrared light (e.g., for eye tracking) and the larger subprojector 614 may be configured to emit visible light (e.g., red, green, blue, and/or white light for producing an image for display to the user).

The light projector assembly 600B may include two receptacles 610. The two receptacles 610 may be positioned and configured to align the subprojectors 612, 614 with corresponding input gratings of a waveguide assembly, as described above.

As shown in FIG. 6C, a light projector assembly 600C may include a single light source 613 on the substrate 601. The single light source 613 may be configured to emit light of a single wavelength or of multiple wavelengths. For example, the single light source 613 may include an array of pixels capable of emitting various colors (e.g., red, blue, green, white, infrared, etc.) and patterns.

The light projector assembly 600C may include two receptacles 610. The two receptacles 610 may be positioned and configured to align the single light source 613 with a corresponding input grating of a waveguide assembly, as described above.

As shown in FIG. 6D, a light projector assembly 600D may include three subprojectors 616, 618, 620. Three subprojectors 106A, 106B, 106C were illustrated in FIGS. 1 and 2 in a triangular configuration. However, as illustrated in FIG. 6D, the three subprojectors 616, 618, 620 may be arranged in a line.

The light projector assembly 600D may include two receptacles 610. In some examples, the two receptacles 610 may be positioned in parallel orientations to each other. In other words, the respective lengths of the two receptacles 610 may extend in a same direction as each other. FIG. 6D illustrates in part that different arrangements and orientations of the receptacles 610 are included in the present disclosure.

In examples and figures described above, the light subprojectors are illustrated as each having a circular shape and the receptacles are illustrated as being rectangular in shape. However, the present disclosure is not so limited. For example, as shown in FIG. 6E, a light projector assembly 600E may include one or more light sources 622 (e.g., subprojectors) having a non-circular shape, such as square or rectangular. In addition, the light projector assembly 600E may include receptacles 611 having a non-rectangular shape, such as square and/or circular. Additional shapes of these components are also possible, such as oval, irregular, heptagonal, octagonal, triangular, etc.

Accordingly, light projector assemblies of various shapes, sizes, and arrangements of light sources, subprojectors, and/or receptacles may be used in conjunction with embodiments of the present disclosure.

Figure 7:
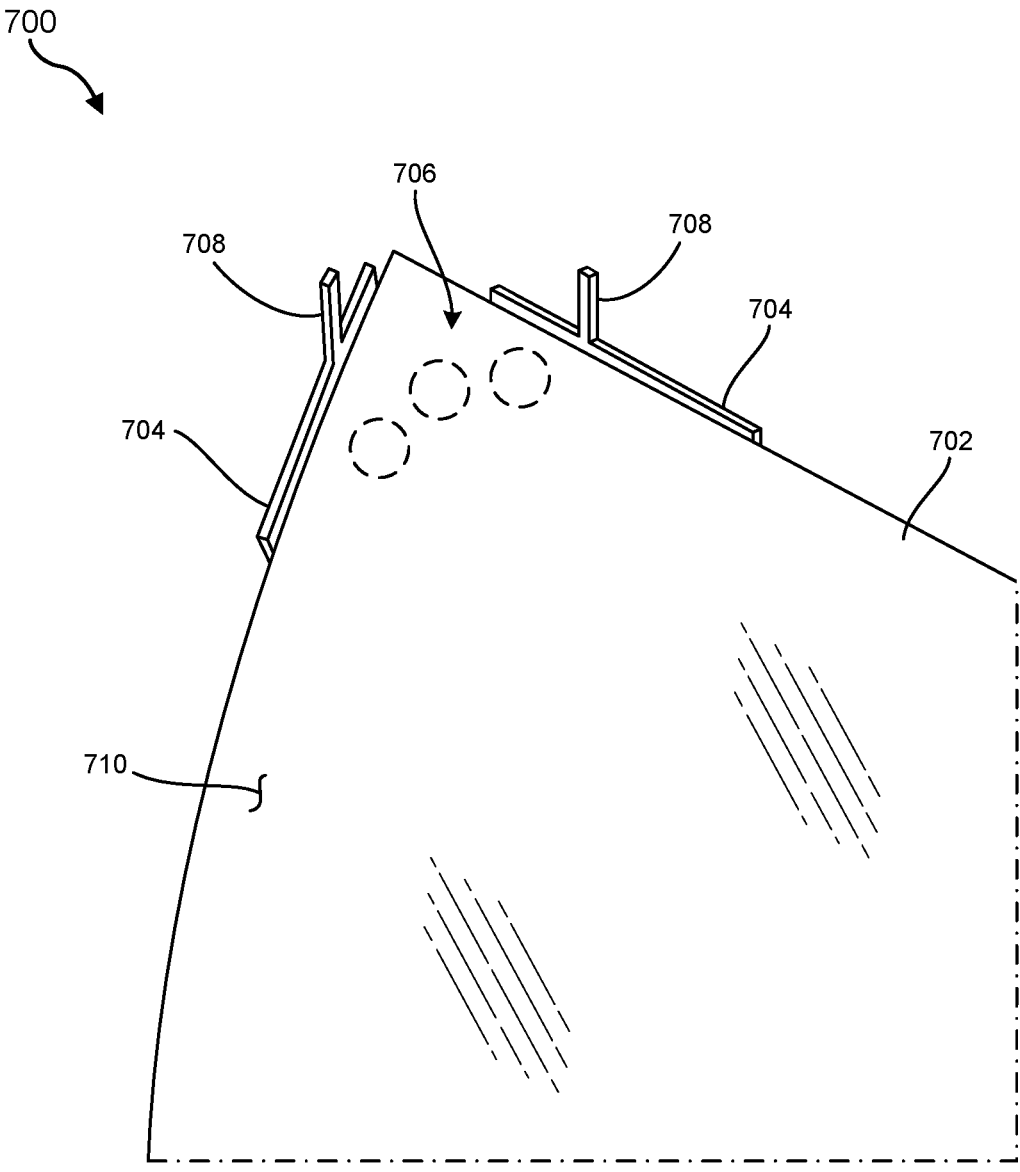
FIG. 7 is a detailed perspective view of a waveguide assembly, according to at least one embodiment of the present disclosure.

FIG. 7 is a detailed perspective view of a waveguide assembly 700, according to at least one embodiment of the present disclosure.

In some examples, the waveguide assembly 700 may include a waveguide 702 and a waveguide holder 704. The waveguide 702 may include at least one input grating 706 positioned to be optically aligned with the light subprojector(s) of a corresponding projector assembly. The input grating 706 may be configured to enable light from the one or more light subprojectors of the projector assembly to enter into the waveguide 702 and to be directed to a central region of the waveguide 702 for presentation to a user's eye.

The waveguide holder 704 may include one or more holder segments abutting an edge region of the waveguide 702. By way of example and not limitation, the waveguide holder 704 may be coupled to the edge region of the waveguide 702, such as with an adhesive, a weld, a fastener, an interference fit, etc. The waveguide holder 704 may also include at least one support leg 708 extending from the waveguide holder 704 in a direction transverse to (e.g., perpendicular to) a major surface 710 (e.g., an eye-facing surface or a world-facing surface) of the waveguide 702. The support legs 708 may be positioned to correspond to locations of receptacles of a corresponding projector assembly (e.g., the receptacles 506 of the light projector assembly 500). In this manner, the support legs 708 may be positioned for insertion into the receptacles to align the input grating 706 with light subprojectors of the projector assembly (e.g., light subprojectors 502 of the light projector assembly 500).

Although FIG. 7 illustrates an example in which the waveguide holder 704 includes two distinct segments coupled to the edge region of the waveguide 702, the present disclosure is not so limited. In additional examples, the waveguide holder 704 may extend along substantially an entire periphery of the waveguide 702, such as in one continuous piece that surrounds the waveguide 702.

FIG. 8 is a cross-sectional side view of an optical assembly 800, according to at least one embodiment of the present disclosure. The optical assembly 800 may include a projector assembly 802 secured to and optically aligned with a waveguide assembly 804.

As illustrated in FIG. 8, the projector assembly 802 may include a first light subprojector 806A, a second light subprojector 806B, and a third light subprojector 806C (collectively referred to as "light subprojectors 806") supported by a projector housing 808. The projector housing 808 may include two receptacles 810, which may be coupled to and extend from the projector housing 808 toward the waveguide assembly 804.

The waveguide assembly 804 may include a waveguide 812 and a waveguide holder 814 secured to an edge region of the waveguide 812. The waveguide holder 814 may include support legs 816 extending toward the projector assembly 802 and into the receptacles 810. A coupling material 818 (e.g., an adhesive (e.g., a liquid-dispensed adhesive), a solder, a weld, etc.) may couple the support legs 816 to the receptacles 810, ultimately coupling the waveguide assembly 804 and the projector assembly 802 to each other.

The waveguide 812 may include input gratings 820 to allow light 830 from the light subprojectors 806 to enter the waveguide 812. For example, during use, the light 830 may pass through optical apertures 822 of the input gratings 820 and may then be directed toward a central region of the waveguide 812 to present an image to a user's eye.

As illustrated in FIG. 8, there may be sufficient space within the receptacles 810 to fit the support legs 816 and to enable movement of the support legs 816 within the receptacles 810 to align the light subprojectors 806. For example, an internal width and length of the receptacles 810 may be at least 1 mm larger than the support legs 816 therein, such as 1 mm larger, 2 mm larger, 3 mm larger, 4 mm larger, or 5 mm larger.

To assemble the projector assembly 802 and the waveguide assembly 804 to each other, a relative position of the projector assembly 802 and the waveguide assembly 804 to achieve an acceptable alignment of the light subprojectors 806 with the input grating 820 may initially be determined. For example, the light subprojectors 806 may be aligned with the input grating 820 to within a predetermined threshold (e.g., within 5 arcminutes or less of rotation, within 2 arcminutes or less of rotation, within 1 mm or less of translation, within 500 μm or less of translation, etc.).

In the case of an adhesive as the coupling material 818, the adhesive may be disposed (e.g., dispensed) in the receptacles 810. The support legs 816 may then be positioned within the receptacles 810 and the projector assembly 802 may be positioned in a lateral and angular position relative to the waveguide assembly 804 for proper alignment. The coupling material 818 may then be cured (e.g., via heat, time, exposure to radiation, and/or a chemical curing agent, etc.) while holding the waveguide assembly 804 and the projector assembly 802 in relative alignment with each other. Alternatively, the coupling material 818 may be solder and/or a weld that is applied when the waveguide assembly 804 and the projector assembly 802 are held in alignment.

Although the receptacles 810 have been described above as being positioned on and extending from the projector housing 808 and the support legs 816 have been described as extending from the waveguide holder 814, the present disclosure is not so limited. In additional examples, the converse may be true and the receptacles 810 may be positioned on and extend from the waveguide holder 814 and the support legs 816 may extend from the projector housing 808.

FIG. 9 is a flow chart illustrating a method 900 of fabricating an optical assembly, according to at least one embodiment of the present disclosure. At operation 910, a location and orientation of a waveguide assembly relative to a projector assembly may be determined to align the projector assembly with the waveguide assembly. Operation 910 may be performed in a variety of ways. For example, a process as described above with reference to FIG. 3 may be performed. Light may be projected by the projector assembly through the waveguide assembly, and a projected image may be compared to a target image. A corrective movement (e.g., translation, tip/tilt, and/or rotation) of the projector assembly relative to the waveguide may be determined to align the projected image with the target image to within a predetermined threshold.

At operation 920, at least one support leg of the waveguide assembly may be positioned within at least one respective receptacle of the projector assembly such that the waveguide assembly reaches the determined location and orientation relative to the projector assembly. Operation 920 may be performed in a variety of ways. For example, the projector assembly and/or the waveguide assembly may be held and moved by a multi-axis movement tool, such as a six-axis hexapod. In some examples, two support legs may be positioned within two respective receptacles.

At operation 930, the at least one support leg of the waveguide assembly may be coupled to the at least one receptacle of the projector assembly to secure the waveguide assembly to the projector assembly in the determined location and orientation relative to the projector assembly. Operation 930 may be performed in a variety of ways. For example, the support leg may be adhered, soldered, and/or welded within the receptacle. An adhesive, solder material, and/or weld material may be dispensed within the receptacle and allowed to harden (e.g., cooled, cured, etc.).

Accordingly, the present disclosure includes optical assemblies, head-mounted displays, and related methods that may exhibit improved optical quality and that may facilitate manufacturing. For example, optical assemblies may include a projector assembly and a waveguide assembly. The projector assembly may include a housing and at least one light subprojector supported by the housing. The waveguide assembly may include a waveguide and a waveguide holder. The waveguide holder may include at least one support leg positioned within, and secured to, at least one respective receptacle of the housing. This arrangement may improve assembly in a way that achieves a desired optical quality by facilitating optical alignment of the light subprojectors with input gratings of the waveguide.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
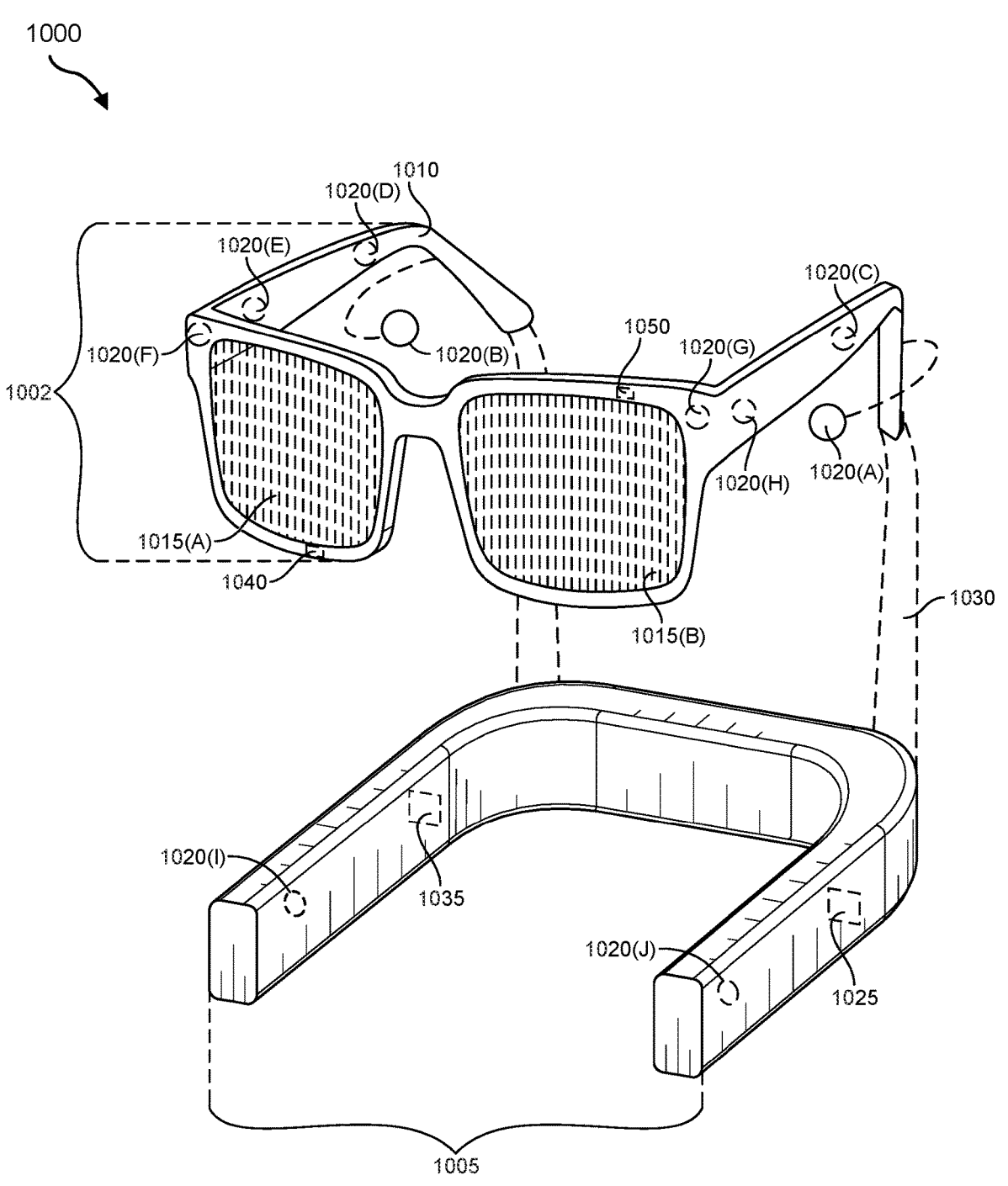
FIG. 10 is an illustration of example augmented-reality glasses that may be used in connection with embodiments of this disclosure.
Figure 11:
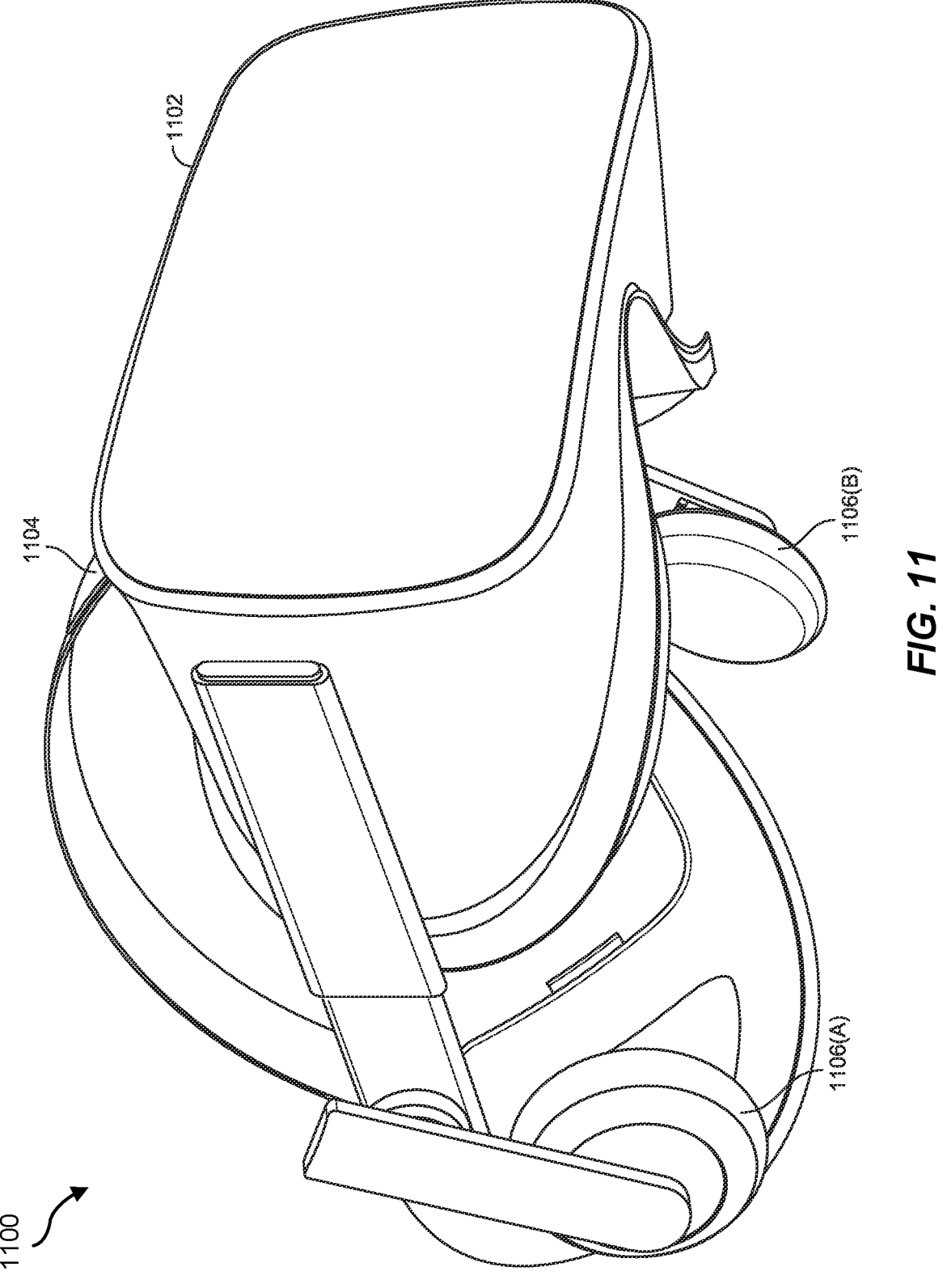
FIG. 11 is an illustration of an example virtual-reality headset that may be used in connection with embodiments of this disclosure.

Turning to FIG. 10, the augmented-reality system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the augmented-reality system 1000 includes two displays, embodiments of this disclosure may be implemented in augmented-reality systems with a single NED or more than two NEDs.

In some embodiments, the augmented-reality system 1000 may include one or more sensors, such as sensor 1040. The sensor 1040 may generate measurement signals in response to motion of the augmented-reality system 1000 and may be located on substantially any portion of the frame 1010. The sensor 1040 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1000 may or may not include the sensor 1040 or may include more than one sensor. In embodiments in which the sensor 1040 includes an IMU, the IMU may generate calibration data based on measurement signals from the sensor 1040. Examples of the sensor 1040 may include, without limitation, accelerometers, gyroscopes, magnetometers, other suitable types of sensors that detect motion, sensors used for error correction of the IMU, or some combination thereof.

In some examples, the augmented-reality system 1000 may also include a microphone array with a plurality of acoustic transducers 1020(A)-1020(J), referred to collectively as acoustic transducers 1020. The acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on the frame 1010, and/or acoustic transducers 1020(1) and 1020(J), which may be positioned on a corresponding neckband 1005.

In some embodiments, one or more of the acoustic transducers 1020(A)-(J) may be used as output transducers (e.g., speakers). For example, the acoustic transducers 1020(A) and/or 1020(B) may be earbuds or any other suitable type of headphone or speaker.

The configuration of the acoustic transducers 1020 of the microphone array may vary. While the augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on the frame 1010, an orientation associated with each acoustic transducer 1020, or some combination thereof.

The acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to the acoustic transducers 1020 inside the ear canal. Having an acoustic transducer 1020 positioned next to an ear canal of a user may enable the microphone array to collect information on how sounds arrive at the ear canal. By positioning at least two of the acoustic transducers 1020 on either side of a user's head (e.g., as binaural microphones), the augmented-reality device 1000 may simulate binaural hearing and capture a 3D stereo sound field around about a user's head. In some embodiments, the acoustic transducers 1020(A) and 1020 (B) may be connected to the augmented-reality system 1000 via a wired connection 1030, and in other embodiments the acoustic transducers 1020(A) and 1020(B) may be connected to the augmented-reality system 1000 via a wireless connection (e.g., a BLUETOOTH connection). In still other embodiments, the acoustic transducers 1020(A) and 1020 (B) may not be used at all in conjunction with the augmented-reality system 1000.

The acoustic transducers 1020 on the frame 1010 may be positioned in a variety of different ways, including along the length of the temples, across the bridge, above or below the display devices 1015(A) and 1015(B), or some combination thereof. The acoustic transducers 1020 may also be oriented such that the microphone array is able to detect sounds in a wide range of directions surrounding the user wearing the augmented-reality system 1000. In some embodiments, an optimization process may be performed during manufacturing of the augmented-reality system 1000 to determine relative positioning of each acoustic transducer 1020 in the microphone array.

In some examples, the augmented-reality system 1000 may include or be connected to an external device (e.g., a paired device), such as the neckband 1005. The neckband 1005 generally represents any type or form of paired device. Thus, the following discussion of the neckband 1005 may also apply to various other paired devices, such as charging cases, smart watches, smart phones, wrist bands, other wearable devices, hand-held controllers, tablet computers, laptop computers, other external compute devices, etc.

As shown, the neckband 1005 may be coupled to the eyewear device 1002 via one or more connectors. The connectors may be wired or wireless and may include electrical and/or non-electrical (e.g., structural) components. In some cases, the eyewear device 1002 and neckband 1005 may operate independently without any wired or wireless connection between them. While FIG. 10 illustrates the components of the eyewear device 1002 and neckband 1005 in example locations on the eyewear device 1002 and neckband 1005, the components may be located elsewhere and/or distributed differently on the eyewear device 1002 and/or neckband 1005. In some embodiments, the components of the eyewear device 1002 and neckband 1005 may be located on one or more additional peripheral devices paired with the eyewear device 1002, neckband 1005, or some combination thereof.

Pairing external devices, such as the neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 since users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a stand-alone eyewear device. Since weight carried in the neckband 1005 may be less invasive to a user than weight carried in the eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1005 may be communicatively coupled with the eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(1) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(1) and 1020(J) may be positioned on neckband 1005, thereby increasing the distance between the neckband acoustic transducers 1020(1) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The following example embodiments are also included in this disclosure:

Example 1: An optical assembly, which may include: a projector assembly, including: a housing including at least one receptacle; and at least one light subprojector supported by the housing; and a waveguide assembly, including: a waveguide configured for redirecting light from the at least one light subprojector, the waveguide including at least one input grating corresponding to the at least one light subprojector; and a waveguide holder abutting an edge region of the waveguide and including at least one support leg extending from the waveguide holder in a direction transverse to a major surface of the waveguide, wherein the at least one support leg of the waveguide assembly is positioned at least partially within and coupled to the at least one receptacle of the projector assembly to secure the waveguide assembly to the projector assembly.

Example 2: The optical assembly of Example 1, wherein the at least one support leg is coupled to the at least one receptacle with an adhesive disposed within the at least one receptacle.

Example 3: The optical assembly of Example 2, wherein the adhesive is a liquid-dispensed adhesive.

Example 4: The optical assembly of any of Examples 1 through 3, wherein: the at least one receptacle includes a first receptacle and a second receptacle; and the at least one support leg includes a first support leg positioned at least partially within the first receptacle and a second support leg positioned at least partially within the second receptacle.

Example 5: The optical assembly of Example 4, wherein: the first receptacle includes a first rectangular receptacle having a first length extending in a first direction; and the second receptacle includes a second rectangular receptacle having a second length extending in a second direction substantially perpendicular to the first direction.

Example 6: The optical assembly of any of Examples 1 through 5, wherein the at least one light subprojector is aligned with the at least one input grating to within 1 mm or less of translation and within 5 arcminutes or less of rotation.

Example 7: The optical assembly of any of Examples 1 through 6, wherein the at least one support leg is coupled to the at least one receptacle with at least one of a solder or a weld.

Example 8: The optical assembly of any of Examples 1 through 7, wherein the at least one support leg extends substantially perpendicular to the major surface of the waveguide.

Example 9: The optical assembly of any of Examples 1 through 8, wherein the at least one light subprojector includes at least three light subprojectors, each of the at least three light subprojectors being configured for projecting a different respective wavelength of light.

Example 10: The optical assembly of Example 9, wherein each of the at least three light subprojectors is configured for projecting one of: red light; blue light; green light; infrared light; or white light.

Example 11: The optical assembly of Example 10, wherein the at least three light subprojectors include a red light subprojector, a blue light subprojector, and a green light subprojector.

Example 12: The optical assembly of any of Examples 1 through 11, wherein the waveguide holder extends along substantially an entire periphery of the waveguide.

Example 13: A head-mounted display, which may include: an optical assembly, including: a projector assembly including: a projector assembly including at least one light subprojector and at least one receptacle; and a waveguide assembly including a waveguide and a waveguide holder coupled to an edge region of the waveguide, wherein the waveguide holder includes at least one support leg extending from the waveguide holder in a direction transverse to a major surface of the waveguide, wherein the at least one support leg is positioned at least partially within and coupled to the at least one receptacle to secure the waveguide assembly to the projector assembly; and a frame configured for mounting the optical assembly on a head of a user with at least a portion of the waveguide in front of eyes of the user.

Example 14: The head-mounted display of Example 13, wherein the head-mounted display includes augmented-reality glasses.

Example 15: The head-mounted display of any of Examples 13 or 14, wherein the projector assembly is mounted to an upper corner of the waveguide when the frame is worn on the head of the user.

Example 16: The head-mounted display of any of Examples 13 through 15, wherein the at least one light subprojector is optically aligned with at least one respective input grating of the waveguide to within a predetermined threshold.

Example 17: The head-mounted display of Example 16, wherein the predetermined threshold is within 1 mm or less of translation and within 5 arcminutes or less of rotation.

Example 18: A method of fabricating an optical assembly, which may include: determining a location and orientation of a waveguide assembly relative to a projector assembly to optically align the projector assembly with the waveguide assembly; positioning at least one support leg of the waveguide assembly within at least one respective receptacle of the projector assembly such that the waveguide assembly reaches the determined location and orientation relative to the projector assembly; and coupling the at least one support leg to the at least one receptacle to secure the waveguide assembly in the determined location and orientation relative to the projector assembly.

Example 19: The method of Example 18, further including dispensing an adhesive within the at least one receptacle, wherein coupling the at least one support leg to the at least one receptacle includes curing the adhesive to adhere the at least one support leg within the at least one receptacle.

Example 20: The method of Example 18 or Example 19, wherein positioning at least one support leg of the waveguide assembly within at least one respective receptacle of the projector assembly includes positioning a first support leg within a first receptacle and positioning a second support leg within a second receptacle.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical assembly, comprising:
a projector assembly, comprising:
    a housing including at least one receptacle; and
    at least one light subprojector supported by the housing; and
a waveguide assembly, comprising:
    a waveguide configured for redirecting light from the at least one light subprojector, the waveguide including at least one input grating corresponding to the at least one light subprojector; and
    one or more waveguide holders abutting an edge region of the waveguide and directly physically coupled to:
        a support leg extending from a respective waveguide holder of the one or more waveguide holders in a direction transverse to a major surface of the waveguide,
        another support leg, different than the support leg, extending from the waveguide holder in another direction transverse to the major surface of the waveguide,
    wherein the support leg and the other support leg are positioned at least partially within and coupled to the at least one receptacle of the projector assembly to (i) secure the waveguide assembly to the projector assembly, and (ii) align the waveguide with respect to the light subprojector such that refracted light from the at least one light subprojector is directed toward an eye of a wearer of the optical assembly.

2. The optical assembly of claim 1, wherein at least one of the support leg or the other support leg is coupled to the at least one receptacle with an adhesive disposed within the at least one receptacle.

3. The optical assembly of claim 2, wherein the adhesive is a liquid-dispensed adhesive.

4. The optical assembly of claim 1, wherein:
the at least one receptacle comprises a first receptacle and a second receptacle; and
the support leg comprises a support leg positioned at least partially within the first receptacle and the other support leg is positioned at least partially within the second receptacle.

5. The optical assembly of claim 4, wherein:

the first receptacle comprises a first rectangular receptacle having a first length extending in a first direction; and the second receptacle comprises a second rectangular receptacle having a second length extending in a second direction substantially perpendicular to the first direction.

6. The optical assembly of claim 1, wherein the at least one light subprojector is aligned with the at least one input grating to within 1 mm or less of translation and within 5 arcminutes or less of rotation.

7. The optical assembly of claim 1, wherein at least one of the support leg and the other support leg is coupled to the at least one receptacle with at least one of a solder or a weld.

8. The optical assembly of claim 1, wherein at least one of the support leg and the other support leg extends substantially perpendicular to the major surface of the waveguide.

9. The optical assembly of claim 1, wherein the at least one light subprojector comprises at least three light subprojectors, each of the at least three light subprojectors being configured for projecting a different respective wavelength of light.

10. The optical assembly of claim 9, wherein each of the at least three light subprojectors is configured for projecting one of:

red light;

blue light;

green light;

infrared light; or white light.

11. The optical assembly of claim 10, wherein the at least three light subprojectors comprise a red light subprojector, a blue light subprojector, and a green light subprojector.

12. The optical assembly of claim 1, wherein a respective waveguide holder of the one or more waveguide holders extends along substantially an entire periphery of the waveguide.

13. A head-mounted display, comprising:

an optical assembly, comprising:

a projector assembly including at least one light subprojector and at least one receptacle; and a waveguide assembly including a waveguide and one or more waveguide holders coupled to an edge region of the waveguide, wherein the one or more waveguide holders are directly physically coupled to a support leg extending from the waveguide holder in a direction transverse to a major surface of the waveguide, and is directly physically coupled to another support leg, different than the support leg, extending from a respective waveguide holder of the one or more waveguide holders in another direction transverse to the major surface of the waveguide, wherein the support leg and the other support leg are positioned at least partially within and coupled to the at least one receptacle to (i) secure the waveguide assembly to the projector assembly, and (ii) align the waveguide with respect to the light subprojector such that refracted light from the at least one light subprojector is directed toward an eye of a wearer of the optical assembly; and a frame configured for mounting the optical assembly on a head of the wearer with at least a portion of the waveguide in front of eyes of a user.

14. The head-mounted display of claim 13, wherein the head-mounted display comprises augmented-reality glasses.

15. The head-mounted display of claim 13, wherein the projector assembly is mounted to an upper corner of the waveguide when the frame is worn on the head of the user.

16. The head-mounted display of claim 13, wherein the at least one light subprojector is optically aligned with at least one respective input grating of the waveguide to within a predetermined threshold.

17. The head-mounted display of claim 16, wherein the predetermined threshold is within 1 mm or less of translation and within 5 arcminutes or less of rotation.

* * * * *